United States Patent Office 2,865,760
Patented Dec. 23, 1958

2,865,760

SHORTENING CONTAINING OXYGENATED THERMALLY MODIFIED HARD FAT

Joseph W. Bremer, Jr., Chicago, and Lee Hilfman, Highland Park, Ill., assignors to Swift & Company, Chicago, Ill., a corporation of Illinois No Drawing. Application December 24, 1956
Serial No. 630,018

7 Claims. (Cl. 99—123)

This invention relates to an improved shortening composition, and, more particularly, to a shortening for use in production of batter, doughs, and the like.

Repeated attempts have been made in the past to develop formulations for production of light, well-formed baked goods. Such products are characterized by a homogeneous cell structure having a high ratio of voids to solids. In most non-yeast raised baked goods, shortening is used as the leavening agent, either alone or in combination with a baking powder. These shortenings normally comprise blends of animal vegetable compounds, all-vegetable compounds containing small amounts of highly hydrogenated vegetable oils, or completely hydrogenated vegetable oils. Baked goods in which these shortenings are employed unfortunately display wide variations in cell structure and, correspondingly, in the qualities of lightness and tenderness commonly associated with the best in bakery products. For this reason, much attention has been accorded the development of more efficacious shortening compositions.

It is therefore an object of the present invention to provide a shortening composition which will consistently yield baked goods distinguished by large volumes and uniformity of cell structure.

A further object of this invention is to provide a shortening composition in which the leavening action is calculated to produce a fine grain structure throughout the product.

Additional objects not specifically alluded to herein will be apparent to one skilled in the art from the detailed description of the invention which follows.

In general, this invention comprises a combination of shortening material and preferably at least about 0.005% by weight of oxygenated, thermally modified hard fat. The hard fat additive may be described as a deodorized product of refined and bleached vegetable oil, or marine fat, or animal fat hydrogenated to an iodine value of about 1 to 10 and oxidized to a point of completion as indicated by an increase in refractive index of 8 or 9 units, measured on the butyro scale, over that of the hydrogenated material.

More particularly, the present invention contemplates a shortening composition in which oxygenated, thermally modified hard fat is incorporated in shortening preferably in amounts ranging from about 0.005% to about 1% by weight. It is to be emphasized that the precise quality of the hard fat additive which will produce optimum results will vary with the particular bakery formulation and economic factors peculiar thereto. The hard fat additive itself is reddish brown in color and as a consequence imparts to bakery products a color dependent on the quantity of hard fat present. In baked goods normally and desirably light in color, it is therefore obvious that the amount of hard fat added to the shortening must be maintained below that sufficient to impart an undesirable color thereto. Moreover, if the bakery product is commonly darker in color, the added cost of the shortening with hard fat additive must be balanced against the increased value associated with the greater volume and enhanced quality of the product. Fortunately, however, substantial improvement in texture and volume are realized from use of small amounts of the shortening additive which are safely below those associated with undesirable color changes, even in cakes of the lightest color. As a preferred embodiment of the present invention as applied to pound cake, it has been found that the typical pound cake test formula as hereinafter described produces a product of optimum quality, with cost and color considered, when 0.03% oxygenated, thermally modified hard fat is incorporated in the shortening. In all cases, experience has shown that optimum baking properties are obtained from the shortening compositions herein described when the material is allowed to temper at approximately 85° F. for a period of about one week.

In preparing the oxygenated, thermally modified hard fat, vegetable oil or animal fat (refined and bleached if necessary) is charged to a converter to which approximately 0.1% by weight of commercially reduced nickel catalyst (25 percent nickel) is added. The catalyst and oil or fat are heated under a vacuum of 25-27 inches of mercury to a temperature of 350–400° F. Hydrogen at 30 pounds per square inch is then admitted to the converter until the iodine value of the oil or fat is reduced to approximately 10 or below. Hydrogenation is accompanied by a drop in refractive index of 16 to 18 units with vegetable oil and 6 to 8 units with animal fats, as measured on the butyro scale, and may serve as a means for following the progress of the reaction. (The butyro scale is widely used in measuring refractive index of fats and oils, a butyro-scale reading of 40 corresponding to a refractive index of 1.4524, as indicated in Technical Methods of Analysis, R. C. Griffen, 2nd edit., McGraw-Hill, 1927.) The reacted mass is then cooled and filtered to remove the catalyst and heated to a temperature of 450–500° F. While at this temperature, air is introduced by means of a dispersion tube at a rate of approximately 2,000 cubic centimeters per minute for 5–6 hours. This oxidation reaction may likewise be charted by reference to refractive index determinations, an increase of 8 or 9 units being indicative of completion of the reaction. The reacted material is then subjected to steam distillation under vacuum of 1–12 millimeters of mercury for a period of approximately 4 hours to accomplish deodorization. On cooling to ambient temperatures, the oxygenated, thermally modified hard fat is ready for incorporation into the shortening.

The decrease in refractive index as hydrogenation proceeds is to be expected as a normal incident to saturation of the double bonds, there being a corresponding decrease in iodine number. The increase in refractive index on oxidation is accomplished by a slight increase in iodine number, but such increase is not proportionate to the refractive index rise. For example, an increase of 8 or 9 units in refractive index normally would indicate a corresponding rise in iodine number of 48 to 54 units. However, when this increase in refractive index is due to an oxidation reaction, the iodine value is observed to increase only 1 to 6 units, the final value never being more than 10. The mechanism of this anomalous response is not clearly understood.

In the procedure outlined above the oxidation reaction differs substantially from that occurring as a normal incident to exposure of the material to air. Not only is the reaction more complete by virtue of the actual introduction of air within the mass, but, more important, the high temperature employed in conjunction with aeration initiates a polymerization and hydroxylation reaction in which it is speculated that additional products such as aldehydes and ketones are formed. It is these effects of the high temperature treatment together with the continuous passage of air through the material to which reference is made by the term "oxygenated, thermally modified." The product is denominated basically as a "hard fat" because it is a refined and bleached vegetable oil or marine fat, or animal fat which has been hydrogenated to a low iodine value.

EXAMPLE

Preparation of shortenings 100 pounds of cottonseed oil hydrogenated in the usual manner to an iodine number of 5 was charged into a kettle. The fat was heated to 450°–460° F. with vigorous agitation while air was bubbled through at a rate of 2000 cc. per minute. After 20 hours and a rise of refractive index from 32.6 to 39.5 the reaction was stopped and cooled to 200° F. The oxygenated thermally modified hard fat was charged into a deodorizer and subjected to a vacuum of 5 millimeters of mercury and heated to a temperature of 410° F. for a period of four hours. Upon cooling to 200° F. the oxygenated thermally modified hard fat was poured into a drum, from which certain specified amounts were weighed out to be added into the following prepared shortenings.

To 900 pounds of cottonseed oil which was hydrogenated to an iodine number of 78 was added 100 pounds of cottonseed oil hydrogenated to an iodine member of 10. This mixture was heated to 150° F. with continued agitation until all hard fat was melted and dissolved into the oil. This 1000 pound batch of shortening was then divided into ten 100 pound batches. To each of these batches was added respectively the following amount of oxygenated thermally modified hard fat based on the weight of the shortening: 0.0%, 0.005%, 0.01%, 0.03%, 0.06%, 0.10%, 1.00%, 3.00%, 7.50%, 10.00%. Each batch was chilled in conventional manner in the rotator to a temperature of 68°–70° F. and filled into 3 pound can and stored in an 85° room for one week to temper.

Oxygenated thermally modified hard fat per se is not a suitable additive in bakery operations. Due to the relative hardness or brittleness of this material, incorporation into the fat or the cake batter is virtually impossible. Addition of this material to the shortening in the molten or liquid state causes a breakdown of the crystalline structure of the base fat. It also results in less than optimum dispersion of the shortening. Addition of the molten oxygenated thermally modified hard fat to an aqueous batter is unsatisfactory due to the formation of hard particles of this material which is not readily dispersible; therefore, the only suitable means of use in the bakery is prior incorporation of this "additive" into the fat (liquid state) prior to plasticizing the shortening.

Preparation of pound cake

In bakery test procedure, a formula is desirable which is sensitive to variations in shortening performance. Such a formula is:

|  | Pounds | Ounces |
|---|---|---|
| (1) Shortening | 0 | 12 |
| Sugar | 1 | 8 |
| Flour | 0 | 12 |
| Salt | 0 | ¼ |
| Vanilla | 0 | ¼ |
| Milk | 0 | 5 |
| (2) Milk | 0 | 8 |
| Eggs | 0 | 12 |
|  |  | (Blend well) |
| (3) Flour | 0 | 12 |
| (All ingredients at 75° F.) |  |  |

Weigh ingredients listed in (1) above in 10 quart bowl for a bench, Hobart Model C-10, mix at #1 speed for 30 seconds, scrape down the bowl. Cream at #2 speed again for two minutes and scrape down bowl. Then cream at #1 speed for one minute, adding ½ of part (2) during the first 20 seconds. Add (3) and cream one minute at 1st speed.

Cream one minute at 1st speed, adding the other ½ of (2) during the first 20 seconds. Scrape down bowl and cream five minutes at #1 speed. Scale 510 grams of the batter into standard paper lined loaf pans.

Bake 65–67 minutes at 360° F. Allow to cool to room temperature before volume measurements are made. Grain and texture of the cake are to be reported, as well as overall appearance.

Cake volumes

In the control cakes, a commercial shortening consisting of animal fats, vegetable fats, marine fats or combinations thereof was employed in the customary manner. In the test cakes, the commercial shortening was supplemented by small and varying amounts of the oxygenated, thermally modified hard fat hereinbefore described. The increase in cake volumes resulting from incorporation of the improved shortening composition in the cake formulation is readily apparent on comparison of the volumes of such cakes with those containing only commercial shortening, as indicated in the following table:

| Additive Percent by wt. of Shortening | Cake volume, cc. | | | |
|---|---|---|---|---|
|  | Shortening [1] | | | |
|  | Meat fat [2] | Vegetable fat [3] | Blend [4] | Marine oil Blend [5] |
| Control (0.0%) | 1,330 | 1,340 | 1,340 | 1,325 |
| 0.005 | 1,345 | 1,350 | 1,355 | 1,335 |
| 0.01 | 1,390 | 1,395 | 1,395 | 1,380 |
| 0.03 | 1,395 | 1,395 | 1,400 | 1,390 |
| 0.06 | 1,400 | 1,400 | 1,400 | 1,395 |
| 0.10 | 1,435 | 1,430 | 1,435 | 1,430 |
| 1.00 | 1,440 | 1,445 | 1,440 | 1,445 |
| 3.00 | 1,450 | 1,450 | 1,450 | 1,450 |
| 7.50 | 1,465 | 1,465 | 1,465 | 1,465 |
| 10.00 | 1,470 | 1,470 | 1,470 | 1,470 |

[1] All shortenings tempered at 85° F. for one week.
[2] 90% lard plus 10% lard hard fat.
[3] 90% cottonseed oil plus 10% cottonseed oil hard fat.
[4] 50% No. 2 plus 50% No. 3.
[5] 90% (30% herring+70 cottonseed oil)+10% cottonseed oil hard fat.

Addition of small amounts of oxygenated, thermally modified hard fat to shortening is thus seen to impart a quality to the shortening whereby its inclusion in cake formulations yields a higher volume product. From these data the generalization may be drawn that an increase in the content of oxygenated, thermally modified hard fat in the shortening elicits a corresponding or at least a roughly predeterminable increase in cake volume. Coincident with this result was the observation that cake heights, texture, grain and tenderness of the cakes were also improved.

Shortening compositions containing less than 0.005% of oxygenated, thermally modified hard fat exhibit influences on the volume and quality of cakes and other baked goods which shade into the imperceptible and may be generally regarded as having little commercial significance. Concentrations exceeding 1%, on the other hand, are usually feasible only in bakery formulations having basic colors of such intensities as will successfully mask the tendency to color change induced by the oxygenated, thermally modified hard fat.

It will be noted from the foregoing tabulation of results that the selection of a shortening material into which the oxygenated, thermally modified hard fat is incorporated is not critical. Thus the efficacy of the new shortening compositions has proved indistinguishable whether the shortening is derived from meat fat, vegetable fat, or marine fats, or combinations thereof. Vegetable oils in addition to cottonseed oil, for example, peanut oil or soybean oil, may be used if desired without detracting from the physical results in the bakery product which are attributable to the shortening; or, as indicated in the table, blends of animal fats and vegetable oils and marine fats may be employed.

Just as the basic shortening may be prepared from a variety of fatty materials, so also may be oxygenated, thermally modified hard fat be derived from any of the common animal fats, vegetable oils or marine fats of the general types hereinbefore enumerated. Moreover, an oxygenated, thermally modified hard fat produced from one animal fat or vegetable oil may be incorporated in any basic shortening material, or a blended hard fat may be used with a blended shortening, without detracting from the results described.

The present invention has been exemplified by reference to a pound cake formulation which by virtue of incorporation of the improved shortening composition is seen to produce a superior product. This embodiment has been selected as merely representative of advantages to be derived from inclusion of the new shortening composition in production of a wide variety of baked goods. Accordingly, it is to be understood that this invention embraces in scope essentially the field of bakery products to which conventional bakery shortenings are commonly applicable.

The term "oxygenated, thermally modified hard fat" as used in the claims is intended to mean a fat which has been hydrogenated to an iodine value of below 10 and then subjected to oxygenation to increase the refractive index at least 7 units.

It is thus apparent that many modifications and variations of the invention as hereinbefore described may be made without departing from the spirit and scope thereof, and therefore only such limitations should be imposed as are indicated in the appended claims.

We claim:

1. A shortening composition comprising: a shortening material and a small amount of deodorized oxygenated, thermally modified hard fat.

2. A shortening composition comprising: a shortening material and more than about 0.005% by weight of shortening of deodorized oxygenated, thermally modified hard fat.

3. A shortening composition comprising: a shortening material and a small but perceptible amount less than about 1.0% by weight of shortening of deodorized oxygenated, thermally modified hard fat.

4. A shortening composition comprising: a shortening material and about 0.03% by weight of shortening of deodorized oxygenated, thermally modified hard fat.

5. A shortening composition comprising: a shortening material with about 0.03% by weight of shortening of deodorized oxygenated, thermally modified hard fat, wherein said hard fat is characterized by having an iodine value of between approximately 1 and 10 and having an increase in refractive index of 8 to 9 units over the refractive index of starting hydrogenated hard fat.

6. A shortening composition comprising: a shortening material selected from the group consisting of animal fats, vegetable oils, marine oils, and combinations thereof, with about 0.03% by weight of shortening of deodorized oxygenated, thermally modified hard fat.

7. A shortening composition comprising: a shortening material selected from the group consisting of animal fats, vegetable oils, marine oils, and combinations thereof, with approximately 0.03% by weight of shortening of deodorized oxygenated, thermally modified hard fat prepared from a base selected from the group consisting of animal fats, marine oils, vegetable oils and combinations thereof.

References Cited in the file of this patent

UNITED STATES PATENTS

| | | |
|---|---|---|
| 2,223,558 | Epstein | Dec. 3, 1940 |
| 2,308,848 | Young et al. | Jan. 19, 1943 |
| 2,575,874 | Herlow | Nov. 20, 1951 |

UNITED STATES PATENT OFFICE
CERTIFICATE OF CORRECTION

Patent No. 2,865,760

Joseph W. Bremer, Jr., et al.

December 23, 1958

It is hereby certified that error appears in the printed specification of the above numbered patent requiring correction and that the said Letters Patent should read as corrected below.

Column 1, line 60, for "quality" read -- quantity --; column 3, line 27, for "member" read -- number --; line 36, for "rotator" read -- votator --.

Signed and sealed this 21st day of April 1959.

SEAL)

Attest:

KARL H. AXLINE
Attesting Officer

ROBERT C. WATSON
Commissioner of Patents